Figure 1:
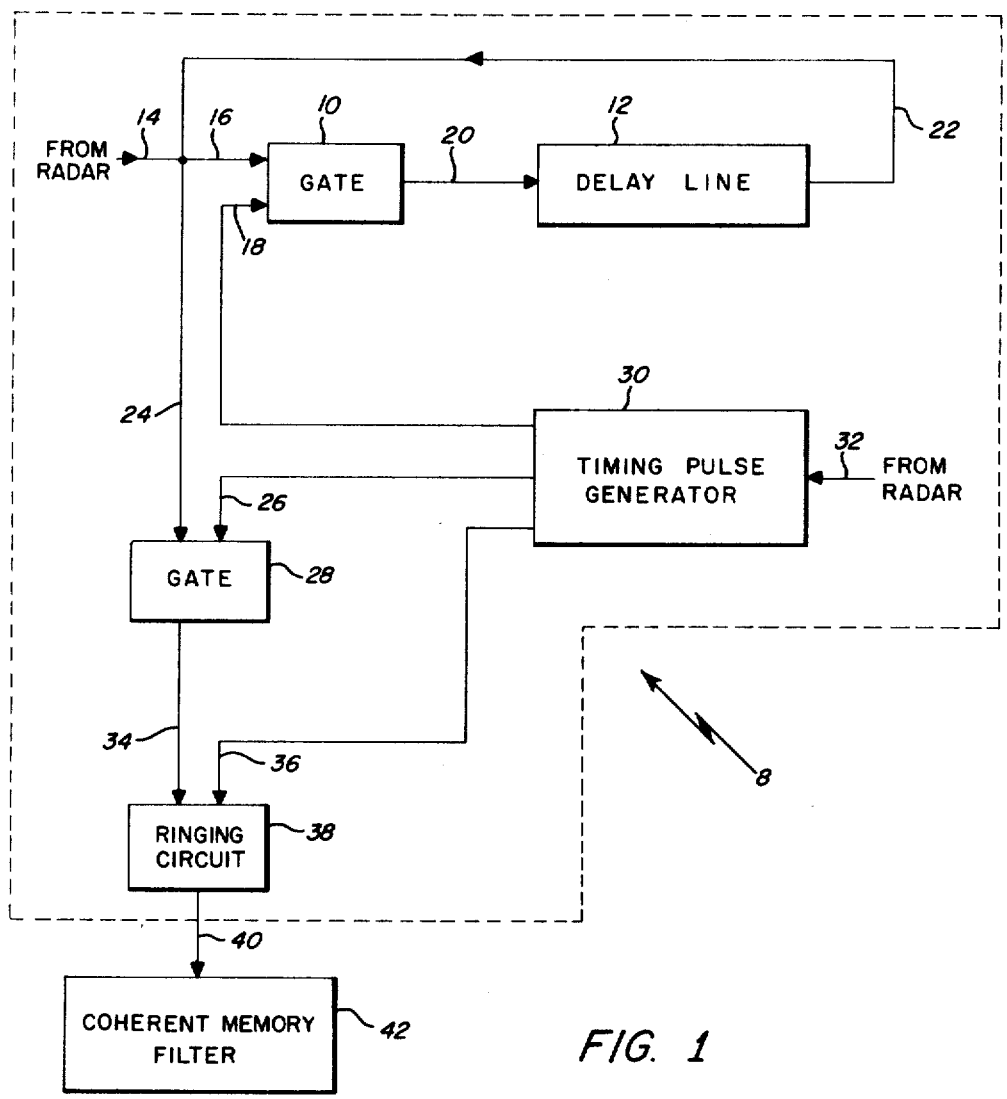

May 23, 1967 N. FREEDMAN 3,321,759
RADAR SPECTRUM ANALYZER
Filed Oct. 13, 1964 2 Sheets-Sheet 1

INVENTOR
NATHAN FREEDMAN
BY Carole M. Colman
AGENT

May 23, 1967 N. FREEDMAN 3,321,759
RADAR SPECTRUM ANALYZER
Filed Oct. 13, 1964 2 Sheets-Sheet 2

INVENTOR
NATHAN FREEDMAN

BY Carole M. Colman
AGENT

United States Patent Office 3,321,759
Patented May 23, 1967

3,321,759
RADAR SPECTRUM ANALYZER
Nathan Freedman, West Newton, Mass., assignor to Raytheon Company, Lexington, Mass., a corporation of Massachusetts
Filed Oct. 13, 1964, Ser. No. 403,756
13 Claims. (Cl. 343—17.2)

This invention is concerned with a radar spectrum analyzer and more particularly with a means for improving the range resolution thereof.

A coherent memory filter is a particularly suitable spectrum analyzer which produces in response to any arbitrary input signal, an output signal closely approximating the frequency spectrum of its input signal. A description of such a filter may be found in an article entitled, "On the Properties of an Active Time-Variable Network: The Coherent Memory Filter," by Jack Capon, presented at the Symposium on Active Networks and Feedback Systems, Polytechnic Institute of Brooklyn, Apr. 19-21, 1960.

Briefly, it comprises both a circulating trigger loop and a signal loop. The signal loop performs the frequency scanning filter function by recirculating an input signal through a closed loop circuit comprising a vectorial adder circuit, a time delay circuit, and a frequency shifting circuit. The time delay circuit delays the applied signal by a fixed amount each time it circulates through the loop. The frequency shifting circuit shifts the frequency of the applied signal up or down by a fixed amount each time it circulates through the loop. The vectorial adder circuit continually adds the input signal to that portion of the input signal circulating in the loop. Accordingly, the output of the coherent memory filter comprises the vectorially added signals and when displayed on suitable amplitude versus time display apparatus appears as a signal having peak amplitudes spaced apart in time and corresponding to the frequency content of the input signal.

The circulating trigger loop periodically establishes the phase of the frequency shift signal oscillations at an arbitrary fixed value once every circulation time delay period. The circulating trigger loop circulates pulses through a closed loop comprising a pulse generator, the signal loop delay line, and a trigger detector. The pulse generator operates a first pulse which is circulated through the signal loop delay line, detected by the trigger detector, and applied to the pulse generator so as to retrigger the pulse generator and produce a second pulse to be circulated through the signal loop delay line. In this manner, a train of pulses is produced having a pulse repetition rate proportional to the signal loop delay time. A portion of the pulse train signal is coupled to a frequency generator external to the circulating trigger loop. The frequency generator selects a harmonic of the pulse train repetition rate so as to derive the aforementioned frequency shift signal.

Although present day coherent memory filters are capable of providing high velocity resolution, they cannot simultaneously therewith provide high range resolution. Ordinarily, high range resolution is achieved through the use of short radiated pulses, or equivalently through the use of any one of the well-known pulse compression techniques. The coherent memory filter, however, is limited in its ability to handle these short pulses by the bandwidth of available ultrasonic delay lines since bandwidth is inversely proportional to the width of these pulses or, similarly, inversely proportional to the product of the required range and velocity resolutions. Consequently, a particularly large bandwidth would be required, and there would be no suitable delay line available on the market.

Accordingly, a primary object of the present invention is to provide a means for a coherent memory filter which allows both high range resolution and high velocity resolution to be achieved simultaneously therein.

A further object is to provide an improved technique for increasing the length of pulses in a pulse train.

Another object is to provide an improved radar spectrum analyzer.

These and related objects are accomplished in one embodiment of the invention by a device which stretches the range interval examined by a radar to almost the instrumented range or a full interpulse period so that the bandwidth required by the coherent memory filter delay line is decreased by the same ratio. There are many radars known in the art which examine such a range interval, notably those for inspecting and tracking objects in space. The radar signal waveform is applied to a unity gain delay line circulator. After each circulator delay period, a timing pulse generator opens a gate to pass the pulse on the output of the circulator through to a high Q tuned circuit, causing it to ring with a phase coherent with the input pulse. Just prior to the arrival of the next pulse in the train, the timing pulse generator provides a signal to a clamping means in the high Q circuit and the ringing therein ceases. In this manner, each consecutive pulse in the input train is stretched to approximately a full interpulse period.

Other objects and applications of the invention will be apparent from the following detailed description of a preferred embodiment and reference to the accompanying drawings, wherein:

FIG. 1 depicts a block diagram of the invention; and,
FIGS. 2(a)–2(g) show the waveforms generated at various points in FIG. 1.

The invention 8, shown in FIG. 1, comprises a unity gain delay line 12, such as a quartz ultra-sonic line, with a gate circuit 10 connected to its input line 20 and its output line 22 connected in a circulating manner to input line 16 of gate 10 as well as to input line 24 of gate circuit 28. Any well-known gates such as diode gates may be used. The latter two input lines 16 and 24 are also connected to line 14 via which the input train of intermediate frequency pulses from a radar (not shown) are received. Gate circuit 28 is connected to high Q ringing circuit 38 which is of well-known type and includes a quenching means such as a shorted transformer winding for terminating the ringing of the circuit 38. Timing pulse generator 30 is responsive to a synchronizing pulse applied to its input line 32 by the radar and provides gating pulses to input lines 18 and 26 of gate circuits 10 and 28, respectively, and quenching pulses to input line 36 of ringing circuit 38. Any suitable timing pulse generator known in the art may be used, for instance a plurality of multivibrators connected to provide the desired waveforms.

The operation of the invention may best be understood with reference to FIG. 2, which depicts the waveforms present at various points in FIG. 1. FIG. 2(a) portrays the input train 44 of four intermediate frequency pulses applied to input line 14 by the radar (not shown). These pulses correspond to echoes received by the radar from four targets which are fairly close together and are of differing sizes. FIG. 2(b) shows the output of delay line 12, that is the recirculated intermediate frequency pulse train 44 which is applied to input line 16 of gate circuit 10 and input line 24 of gate circuit 28. The pulses of FIG. 2(c) are the four intermediate frequency pulses after passing through gate 28, whereas FIG. 2(d) depicts these pulses after they have been stretched by ringing circuit 38. The gating pulse 46 applied to gate 10 by generator 30 is shown in FIG. 2(e), and the gating pulses 48 applied to gate 28 are shown in FIG. 2(f). Similarly, the quenching pulses 50 produced by generator 30 for stopping the ringing in ringing circuit 38 are depicted in FIG. 2(g).

Just prior to the application of the intermediate frequency pulse train 44 to input line 14, a synchronizing pulse is applied to input pulse transfer line 32 of timing generator 30 by the radar (not shown). This allows timing pulse generator 30 sufficient time to generate its first gating pulse 48 so that this pulse 48 is applied to input line 26 of selection gate circuit 28 at the same time that the first intermediate frequency pulse is applied to input line 24. Upon the coincidence of these two pulses on its inputs 24 and 26, gate 28 opens and allows the first pulse to be applied to ringing circuit 38.

Figure 2A:
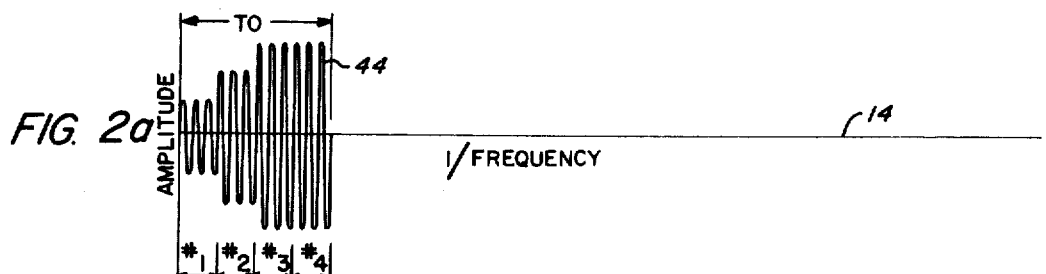
Figure 2B:
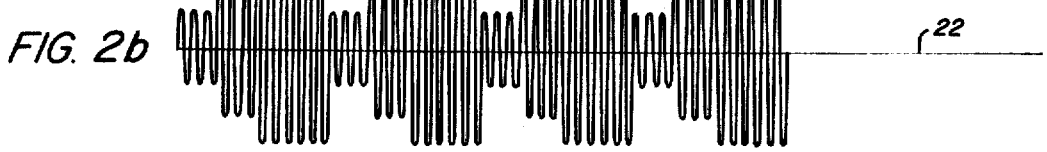
Figure 2C:
Figure 2D:
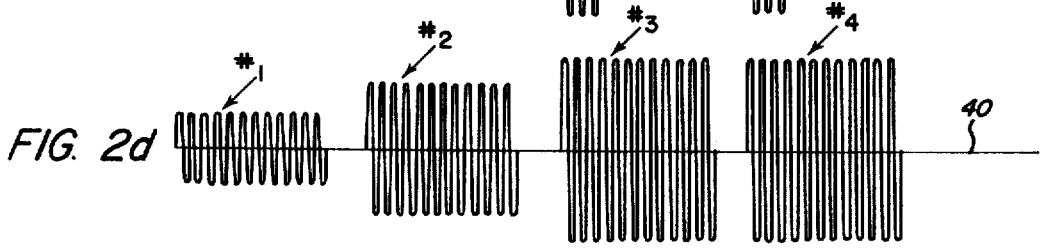
Figure 2E:
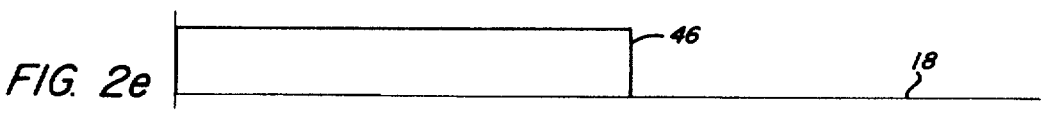

Ringing circuit 38 comprises a high-Q tuned circuit resonant at the center intermediate frequency and having a clamping means for grounding the tuned circuit in response to a quench pulse 50 applied to input line 36 by timing pulse generator 30. When pulse #1 is applied to circuit 38, it begins to ring with a phase coherent with that of the input pulse and with the same amplitude, thus producing linearity. Just prior to the generation of the second gating pulse 48 on input line 26, timing pulse generator 30 applies a quench pulse 50 to input line 36 of ringing circuit 18 which in response thereto terminates the first stretched output pulse #1. This pulse is shown in FIG. 2(d).

The input intermediate frequency pulse train applied to input line 14 comprises, in the present illustration, four consecutive pulses each having an effective length of $w$ seconds. The desired targets are assumed to lie within a time region $T_0$, and the total time between the initial receipt of such trains is $T_m$. The number of pulses within a waveform is $k$, which for the purpose of this explanation is selected as four, and $T_0$ is chosen as four times $w$. It should be appreciated, however, that $T_0$ need not be an integral number of periods $w$.

Delay line 12 delays each pulse applied to its input line 20 by gate circuit 10 for a length of time equal to $T_0$. At the end of this time it reapplies it to input pulse transfer line 16 of gate circuit 10 and also to input line 24 of gate circuit 28. Gate circuit 10 opens upon the coincidence of signals on both of its input lines 16 and 18 and transfers the pulse on its input line 16 to delay line 12. FIG. 2(b) depicts the recirculating pulse train 44 generated on output line 22 of delay line 12. In order to produce this, timing pulse generator 30 terminates the pulse 46 applied to input line 18 of gate 10 at the time shown in FIG. 2(e). This prevents any further intermediate frequency pulses from being applied to the delay line so that only the pulses already stored therein consisting of a full input pulse train will thereafter be produced on output line 22, after which the delay line 12 will be ready for the next pulse train.

Figure 2F:
Figure 2G:
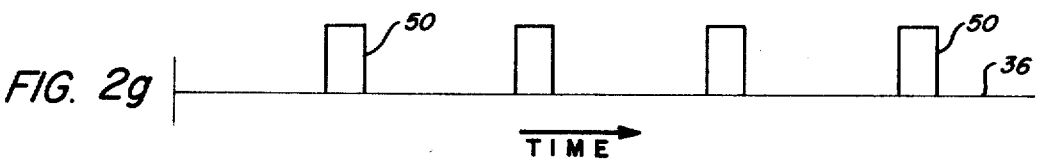

FIG. 2(f) shows the gating pulse train applied to input line 26 of gate circuit 28 by timing pulse generator 30. The duration of time between pulses 48 of this train is equivalent to $T_0+w$. Referring now to both FIGS. 2(b) and 2(f), it is apparent that at the same time that the second timing pulse 48 is applied to input line 26 of gate 28, the second pulse in the intermediate frequency train is again applied to input line 24. Upon the coincidence of these two pulses on its inputs 24 and 26, gate 28 opens, allowing pulse #2 to be applied to input line 34 of ringing circuit 38. In an identical manner as was described above with reference to pulse #1, the application of pulse #2 to circuit 18 produces ringing therein, which is later quenched by the second quench pulse 50 of FIG. 2(g) just prior to the generation of the third gating pulse. Hence, the second pulse in the train of FIG. 2(d) is generated on output line 40.

Similarly, at the time thereafter when the third gating pulse 48 is again applied to gate 28, pulse #3 is applied to its input line 26. The coaction of these two pulses causes gate 28 to open and transfer pulse #3 to ringing circuit 38 where it is expanded to the length shown in FIG. 2(e).

In like manner, at the time the fourth gating pulse 48 is transferred via line 26 to gate 28, pulse #4 is also transferred to it via line 24. The coincidence of these two signals on its inputs 24 and 26 causes gate 28 to open and pulse #4 is applied to input line 34 of ringing circuit 38. In response thereto, the latter circuit 38 produces the expanded pulse #4 depicted in FIG. 2(d).

The expanded pulse waveforms produced on line 40 are applied to coherent memory filter 42 for processing in the manner explained previously. However, by having maximized the input pulse length, the bandwidth of the delay line (not shown) in the coherent memory filter 42 may be minimized and simultaneous high range and high velocity resolution achieved.

Although the invention has been described with reference to a preferred embodiment, it should not be limited thereto. Other modifications and embodiments will be readily apparent to one skilled in the art. For instance, other spectrum analyzers, such as the filter bank or sweeping spectrum analyzer, could be used in place of the coherent memory filter. Accordingly, it is desired that this invention be only limited by the scope of the following claims.

What is claimed is:

1. For operating on a train of pulses each having a predetermined phase and amplitude, a combination of elements comprising:
   a spectrum analyzer for receiving and producing a frequency spectrum analysis of said train of pulses; and
   pulse stretching means connected to said spectrum analyzer for extending the length of each pulse in said train before applying said each pulse to said analyzer for producing said spectrum analysis including ringing circuit means for selectively ringing with the phase and amplitude of said pulses.

2. For operating on a train of pulses each having a predetermined phase and amplitude, a combination of elements comprising:
   a coherent memory filter for receiving said train of pulses; and
   pulse expansion means connected to said coherent memory filter for increasing the separation between said pulses and extending the length of each of said pulses before applying said each pulse to said filter including ringing circuit means for selectively ringing with the phase and amplitude of said pulses.

3. For a coherent memory filter, means for improving the range resolution thereof by operating on a train of intermediate frequency pulses comprising:
   delay means for recirculating said pulse train;
   gating means connected to said delay means for passing a successive one of said input pulses during each recirculation of said input pulse train; and
   pulse generator means connected to said gating means for providing a train of timing pulses and a train of quenching pulses;
   ringing circuit means connected to said gating means and said pulse generator means for ringing with the phase and amplitude of said each successive one input pulse and for stopping in response to one of said quenching pulses.

4. For a coherent memory filter, means for improving the range resolution thereof by increasing the length of each pulse in a train comprising:
   means for generating said pulse train a plurality of times;
   selection means connected to said generating means for passing a successive one of said pulses at equal time intervals between each passing, all of said pulses having been passed a short time prior to the beginning of a next train; and circuit means connected to said selection means for increasing the time duration of said each passed pulse for a time equal to the duration of one of said pulses plus a large proportion of the time between said passed pulses.

5. Pulse expansion means for stretching pulses in a train of input pulses comprising:
means for recirculating said input pulse train;
means for generating a train of timing pulses;
gating means connected to said recirculating means and to said generating means for passing a successive one of said input pulse train pulses during each recirculation of said train; and
means connected to said gate for stretching each of said successive pulses.

6. The invention according to claim 5 and wherein:
said recirculating means comprises a delay means.

7. The invention according to claim 5 and wherein:
said stretching means comprises a ringing circuit.

8. Signal expansion means for stretching signals in a train of input signals comprising:
means for recirculating said input signal train;
means for generating a train of timing signals and a train of quenching signals;
gating means connected to said recirculating means and said train generating means for passing a successive one of said input signals during each recirculation of said input signal train; and
means connected to said gating means and said generating means for stretching said each successive signal and for ceasing stretching in response to one of said quenching signals.

9. The invention according to claim 8 and wherein:
said recirculating means comprises a delay line.

10. The invention according to claim 8 and wherein:
said stretching means comprises a ringing circuit.

11. Pulse expansion means for stretching pulses in a train of input pulses comprising:
delay line means for recirculating said input pulse train;
pulse generator means for producing a train of timing pulses and a train of quenching pulses;
gating means connected to said delay line means and said pulse generator means for passing a successive one of said input pulses during each recirculation of said input pulse train; and
ringing circuit means connected to said gating means and said pulse generator for ringing with the phase and amplitude of said each successive pulse and for stopping ringing in response to one of said quenching pulses.

12. For operating on a train of pulses produced by a radar, a combination of elements comprising:
pulse expansion means for extending the length of each pulse in said train and including,
first pulse transfer means for receiving said train from said radar,
first gating means connected to said first pulse transfer means for passing said train,
delay line means connected between said first gating means and said first pulse transfer means for recirculating said train,
second gating means connected to said first pulse transfer means for passing selected ones of said pulses,
ringing circuit means connected to said second gating means for ringing with the phase and amplitude of said each selected pulse,
second pulse transfer means for receiving synchronizing pulses from said radar, and timing pulse generator means connected to said second pulse transfer means and to said first and second gating means and said ringing circuit means for allowing said first and second gating means to pass said pulses and for stopping said ringing circuit from ringing; and
coherent memory filter means connected to said pulse expansion means for receiving said pulses extended in length.

13. For operating on a train of pulses each having a predetermined phase and amplitude, a combination of elements comprising:
a spectrum analyzer for receiving said train of pulses; and
pulse expansion means connected to said spectrum analyzer for increasing the separation between said pulses and extending the length of each of said pulses before applying said each pulse to said spectrum analyzer including a source of quenching signals, and ringing circuit means coupled to said source for selectively ringing with the phase and amplitude of said pulses and stopping ringing in response to said quenching signals.

References Cited by the Examiner

UNITED STATES PATENTS

| | | | |
|---|---|---|---|
| 2,479,222 | 8/1949 | Edlen | 343—17.7 |
| 3,212,085 | 10/1965 | Lhermitte. | |

References Cited by the Applicant

UNITED STATES PATENTS

| | | |
|---|---|---|
| 2,617,093 | 11/1952 | Fyler. |
| 2,897,490 | 7/1959 | Sunstein. |
| 2,905,894 | 9/1959 | Rudmann. |
| 2,997,650 | 8/1961 | Applebaum. |
| 3,087,153 | 4/1963 | Richards. |

RODNEY D. BENNETT, *Primary Examiner.*